N. E. MERRILL & J. C. CAVENDER.
ROLLER BEARING.
APPLICATION FILED FEB. 28, 1910.
1,019,819.
Patented Mar. 12, 1912.
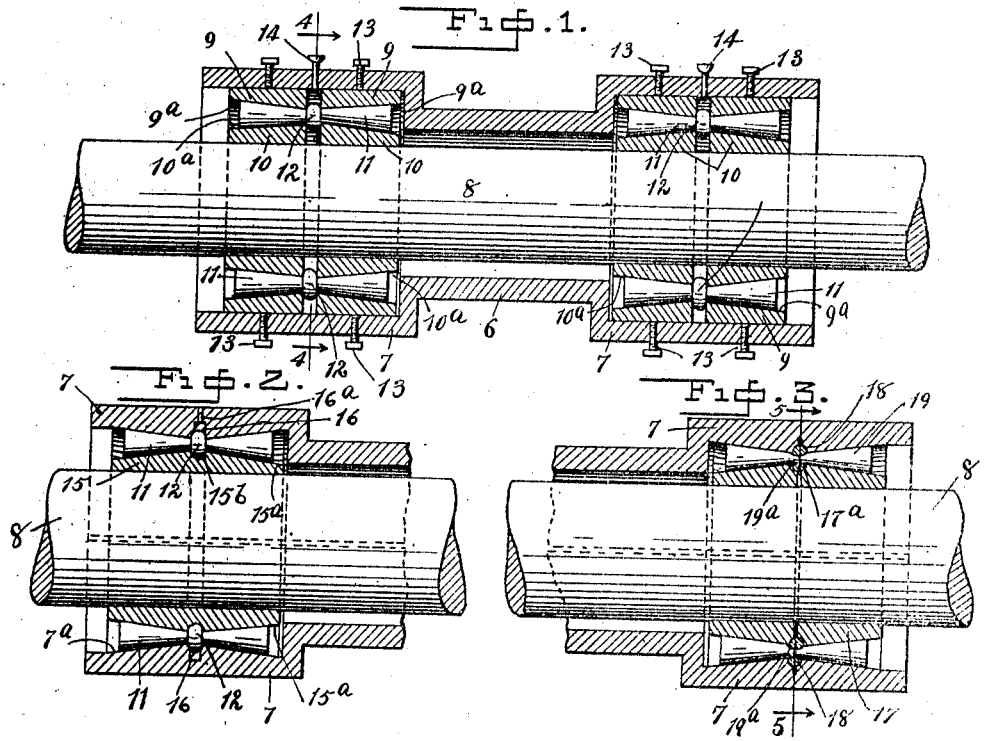

UNITED STATES PATENT OFFICE.

NATE E. MERRILL AND JOHN C. CAVENDER, OF HOBART, INDIANA.

ROLLER-BEARING.

1,019,819.  Specification of Letters Patent.  Patented Mar. 12, 1912.

Application filed February 28, 1910. Serial No. 546,572.

*To all whom it may concern:*

Be it known that we, NATE E. MERRILL and JOHN C. CAVENDER, citizens of the United States, residing at Hobart, in the county of Lake and State of Indiana, have invented certain new and useful Improvements in Roller-Bearings, of which the following is a specification.

This invention relates to improvements in anti-frictional bearings for shafts, axles, etc.

The especial object of the improvements which constitute the subject matter of this application for patent is to produce a roller bearing which will be automatic in caring for the end thrust to which it may be subjected; in which undue wear can be readily taken care of, and which can be easily assembled and readily disassembled for cleaning purposes.

A further advantage is to produce a roller bearing which will be cheap and economical to construct and in which the friction will be reduced to a minimum and effectively distributed over the entire area of the bearing surfaces.

With these and other objects of general utility in view, we have produced the bearing illustrated in preferred forms in the accompanying drawing, in which:—

Figure 1 is a longitudinal sectional view taken through a double journal box to which our improvements have been applied; Figs. 2 and 3 are longitudinal sectional views of single boxes in which the bearings are slightly modified; Fig. 4 is a cross-section on the line 4—4 of Fig. 1, and Fig. 5 is a cross-section on the line 5—5 of Fig. 3.

Referring to the details of the drawing, 6 represents a cylindrical journal box having enlarged portions 7—7, through which extends a shaft 8. Mounted in each of the boxes 7 are twin rings 9—9, the outer surfaces of which are straight and fit snugly against the inner surfaces of the boxes 7, but the inner surfaces are inclined inwardly from the outer edge of the rings to the inner edge as at 9ª. Similar rings 10 are fitted to the shaft 8 with their inclined faces 10ª reversely inclined to the faces 9ª of the rings 9.

Arranged between the two pairs of rings 9 and 10 are a series of rollers 11. Each of these rollers is tapered inwardly from the ends toward the center, and between the inner ends of said tapered portions a rib 12 is formed integral with the tapered portions of said rollers. The ribs 12 have their peripheries convex in cross section and the cross diameter of said ribs is slightly less than the space between the inner ends of the rings 9 and 10. Set screws or bolts 13 enter suitably threaded openings in the walls of the boxes 7 and have their inner ends impinging upon the outer surfaces of the rings 9. An oil-cup and tube 14 penetrates the wall of each of the boxes 7 and the inner end of said tube communicates with the space between the inner ends of the rings 9. The rings 9 and 10 are split longitudinally to facilitate assembling of the parts described.

It will be apparent that a lubricant applied through the oil cup 14 will fall directly upon the rib 12 of the rollers and upon that portion of the surface of the shaft 8 exposed between the inner end of the rings 10. Owing to the centrifugal action of the revolving shaft, rings 10 and rollers 11, the tendency will be to throw the lubricating oil outwardly from the center of the rollers and hence it will be distributed along the surface of the shaft the rollers and their contiguous rings.

In the form of our invention shown in Fig. 2, the rings 9 are dispensed with and a sleeve 15 is substituted for the rings 10. The inner walls 7ª of the box 7 taper inwardly from the opposite ends of the box, and the rollers 11 bear directly against said inner walls on the one side and against the inwardly tapering walls 15ª of the sleeve 15. The sleeve is split longitudinally to facilitate assembling and is formed with an annular recess 15ᵇ adapted to receive the hub 12 of the roller 11. An annular groove 16 is formed in the inner wall of the box 7 in which is placed a suitable packing or antifrictional substance of any well known commercial form. If desired, an oil hole 16ª may be formed through the walls of the box 7 whereby oil may be introduced into the groove 16.

In the form of our invention shown in Fig. 3, we have provided sleeves 17 like the sleeves 10, except that at their inner ends they are recessed as at 17ª to receive a hub ring 18 which is fitted to the center of the tapering rollers 19. This hub ring is transversely cut so that it may be fitted to the reduced central portion 19ª of the rollers 19 and when the ring becomes unduly worn it can be readily removed and a new ring applied.

The forms of boxes shown in Figs. 2 and 3 are preferably constructed in two semi-cylindrical portions which may be held together in any suitable manner, one method of connecting them being shown in Fig. 5.

It will be seen from the construction disclosed and described that while differing slightly in details, the essential features of construction and operation are the same. It will also be seen that the forms disclosed can be cheaply constructed and that when once assembled, lateral displacement of any of the parts cannot occur and all end thrust will be distributed along the coöperating inclined surfaces of the rollers and bearing rings between which they are mounted.

Having thus described our invention, what we claim as new is:—

1. In a journal bearing, a box, rings arranged within said box and having their outer surfaces parallel with the inner walls of the box and their inner surfaces inclined inwardly from their outer edges, other rings having their outer surfaces reversely inclined to the inner surfaces of the first named rings and opposed thereto, and rollers arranged between said opposed rings, said rollers having convex annular hubs midway their ends and having their walls diverging from said hubs and adapted to frictionally engage the adjacent walls of the opposed rings.

2. In a journal bearing, a box, a pair of rings non-rotatably and adjustably mounted in said box and having bearing surfaces inclined inwardly from their outer edges, and having their inner edges spaced apart, another pair of rings rotatably mounted in said box in opposition to said first named rings and having their bearing surfaces oppositely inclined from the opposed rings and having their inner edges spaced apart, rollers arranged between the bearing surfaces of said rings, each of said rollers having an annular projection at its midlength adapted to lie between the inner ends of both pairs of rings, said rollers having bearing surfaces adapted to frictionally engage the bearing surfaces of the said rings.

In testimony whereof we affix our signatures in the presence of two witnesses.

NATE E. MERRILL.
JOHN C. CAVENDER.

Witnesses:
F. BENJAMIN,
M. A. MILORD.